Dec. 18, 1962 R. J. BLINKEN ET AL 3,069,496
IDENTIFICATION DATA CARD READER
Filed Nov. 20, 1959 8 Sheets-Sheet 2

INVENTORS
BERNARD HOWARD
ROBERT J. BLINKEN
BY
ATTORNEYS

Dec. 18, 1962  R. J. BLINKEN ET AL  3,069,496
IDENTIFICATION DATA CARD READER
Filed Nov. 20, 1959  8 Sheets-Sheet 7 fig.12.

INVENTORS
BERNARD HOWARD
ROBERT J. BLINKEN

BY *James and Franklin*
ATTORNEYS

Dec. 18, 1962  R. J. BLINKEN ET AL  3,069,496
IDENTIFICATION DATA CARD READER

Filed Nov. 20, 1959  8 Sheets—Sheet 8

INVENTORS
BERNARD HOWARD
ROBERT J. BLINKEN

BY *James and Franklin*

ATTORNEYS the plane of line 7—7 of FIG. 2;
United States Patent Office
3,069,496
Patented Dec. 18, 1962

3,069,496
IDENTIFICATION DATA CARD READER
Robert J. Blinken, New York, N.Y., and Bernard Howard, Upper Saddle River, N.J., assignors, by mesne assignments, to Mite Corporation, New Haven, Conn., a corporation of Delaware
Filed Nov. 20, 1959, Ser. No. 854,414
15 Claims. (Cl. 178—17)

This invention relates to identification cards such as credit cards, and more particularly to an apparatus for transmitting data from such a card to a remote central office.

Credit cards have come into very wide use. The typical credit card has considerable preprinted information on a flat rectangular card of wallet size. The card frequently has embossed information such as a number code and a name, for use with an ink pad or carbon paper or the like to print the name and number on each bill when the purchase is made.

A difficulty which arises is that a credit card may be voided or invalidated because of loss by the proper holder, or because of non-payment of bills, and one general object of the present invention is to provide an improved credit card, and a card reader or transmitter for use at the dealer, which make possible instantaneous checkup and response from a central office "memory" as to the current validity of the credit card under scrutiny. A purpose of the reader therefore is to extract and transmit machine language data from the credit card to a central "memory" on which the serial numbers of bad credit cards are stored, so that this memory may be telegraphically interrogated from hotels, restaurants, gas stations, merchants, etc., to whom the credit card is presented.

A further object is to provide such a reader which is usable with a credit card of generally conventional character, that is, the typical embossed plastic card which may be used with the pressure printing equipment already in common use. The telegraph circuit also is used to transmit a signal from the memory back to the terminal making the inquiry, to indicate whether the subject serial number is on the bad or void credit card roster. This signal may take the form of a red light and a green light. Another object of the invention is to provide a system which may be operated through existing communications facilities, typically D.C. telegraph loops.

Still another object of the invention is to provide an improved credit card for the contemplated purpose. A still further object is to provide a card reader which is small and relatively simple and inexpensive, so that such readers may be used at the numerous dealers who honor such credit cards.

To accomplish the foregoing general objects, and other more specific objects which will hereinafter appear, our invention resides in the credit card and reader elements, and their relation one to another, as are hereinafter more particularly described in the following specification. The specification is accompanied by drawings in which:

Figures 13, 14:
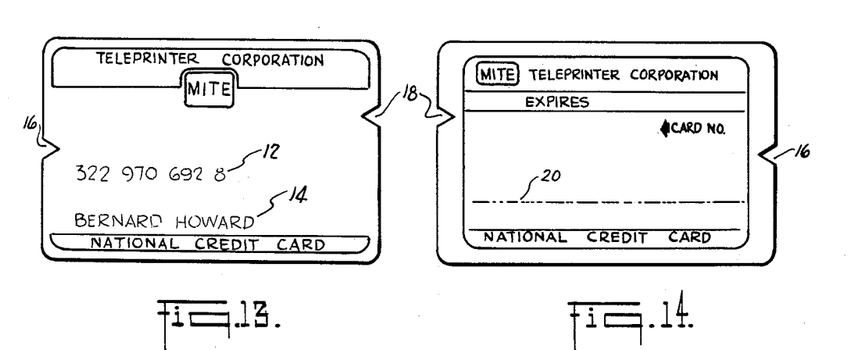
FIG. 13 shows one side of a credit card.
FIG. 14 shows the opposite side of of the credit card, including a recording groove characteristic of our invention.

Referring to the drawing, and more particularly to FIG. 13, the credit card there shown is a small rectangular sheet of usual wallet size, printed with customary data only a part of which is suggested in the drawing. The printed sheet is embedded in or protected by transparent plastic material. The card preferably has raised numbers indicated generally at 12, and raised letters indicated at 14, these affording a local transfer of data by pressure printing directly from the card in accordance with already established techniques. Notches 16 and 18 are provided to insure proper orientation of the card in the printing mechanism, and in the card reader subsequently described herein.

Referring now to FIG. 14, the reverse side of the card may include additional appropriate printed data, and in accordance with the present invention the card has a phonograph type record groove 20 extending longitudinally thereof, this groove being a recording of a tone frequency which is interrupted in accordance with a telegraphic code for transmission of numbers and letters through a phonograph type pickup stylus and cartridge.

The nature of groove 20 may be explained with reference to FIG. 15, in which the vibration corresponding to the tone frequency is indicated at 22, 24, etc., while interruptions or spacings between recordings is indicated at 26, 28, etc. These may vary in length and spacing, making up pulses suggested by the dashes 30, 32, etc. in FIG. 15 and shown in broken line 20 in FIG. 14.

Figure 15:
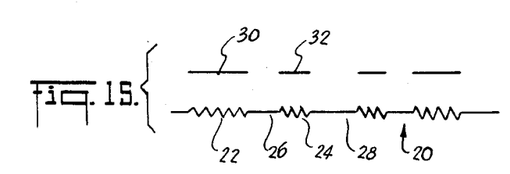
FIG. 15 is explanatory of the recording groove.

The tone frequency suggested in FIG. 15 may be a uniform tone frequency, say at 1,000 cycles, with short lengths recorded and others not, to make up a telegraph transmission which will transmit characters in accordance with a standard code already in use. For example, a five element or five level code may be used, the "ons" and "offs" being in groups of five units, with each group making up one character. It will be understood that the groove 20 in FIG. 14 is scored or indented in the surface of the card, much like a phonograph groove, except that the present groove is generally straight. The recording may be "lateral" or "hill-and-dale."

Figures 1, 2, 2A:
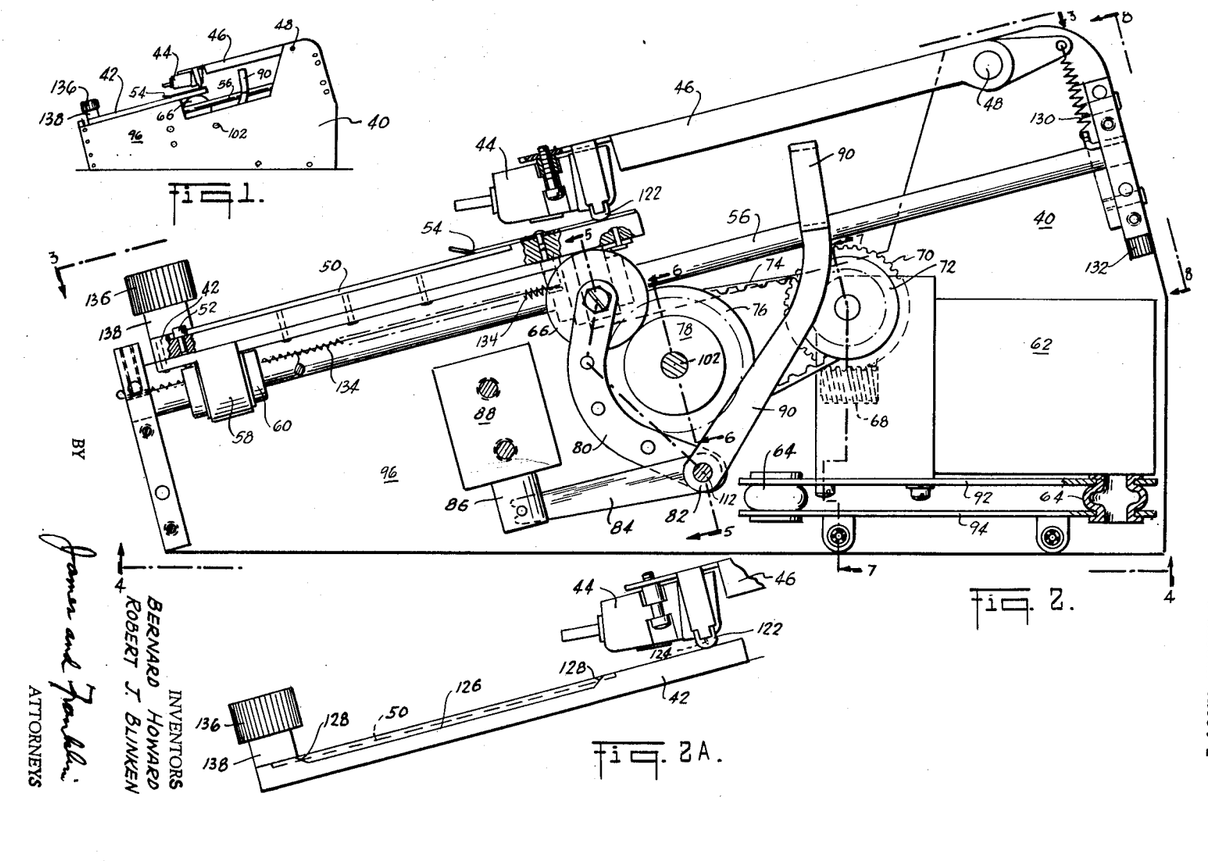
FIG. 1 is a side elevation drawn to small scale of a credit card reader embodying features of our invention.
FIG. 2 is a partially sectioned elevation drawn to larger scale and showing some of the mechanism.
FIG. 2A is explanatory of a detail.

Referring now to FIG. 1 of the drawing, the reader comprises a stationary housing 40 on which a card holder or carriage 42 is slidable. The carriage is shown in its home or starting position, and after being loaded with a card it may move to the right. The card cooperates with a pickup 44 carried on a pickup arm 46 pivoted at 48.

Referring now to FIG. 2, the carriage 42, pickup 44, arm 46 and pivot 48 all correspond to the similarly numbered parts in FIG. 1. FIG. 2 shows a recessed pocket or seat 50 in carriage 42 in which the credit card may be seated, and appropriate locating pins may be provided as indicated at 52 to cooperate with the notches shown in FIGS. 13 and 14 to ensure proper orientation of the card in the seat 50. The card is held in position by one or more retaining springs 54, in this case two.

Figure 5:
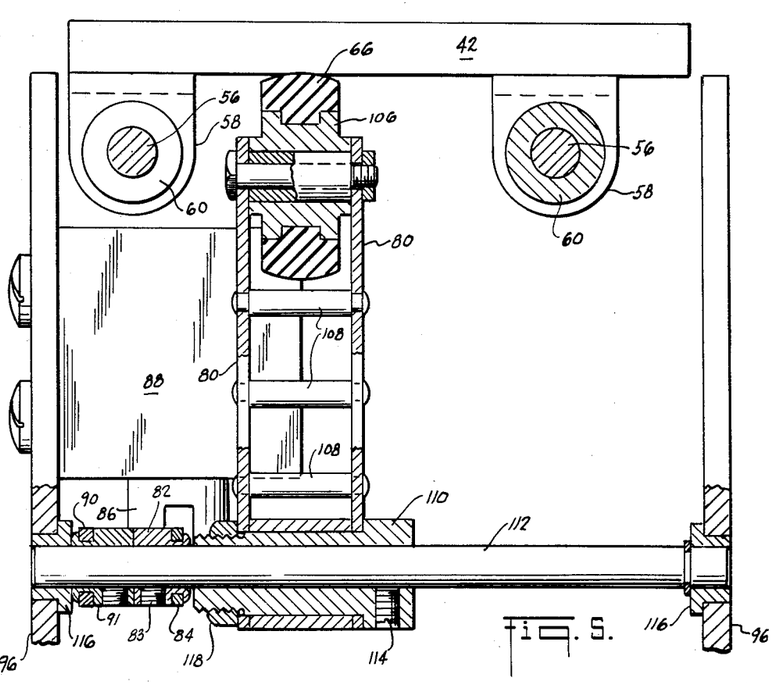
FIG. 5 is a fragmentary transverse section drawn to enlarged scale and taken approximately in the plane of line 5—5 of FIG. 2.
Figure 7:
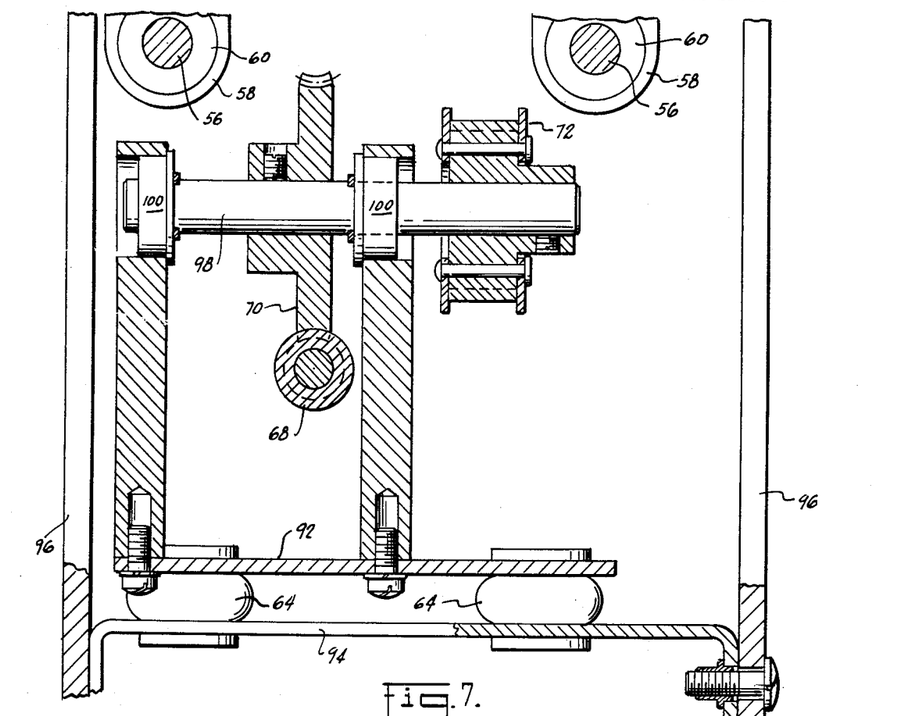
FIG. 7 is a fragmentary transverse section taken approximately in the plane of line 7—7 of FIG. 2.

The carriage 42 is slidable on a pair of spaced parallel rods 56, and for this purpose the carriage has bearing holders 58 with anti-friction bearings 60 (the balls are not shown) which ride freely on the rods 56. The spaced rods 56, bearing holders 58, and bearings 60 are also shown in FIGS. 5 and 7 of the drawings. Reverting to FIG. 2, the carriage is driven to the right by means of a motor 62, preferably mounted on cushioned vibration mounts 64. The motor 62 drives a final pulley 66 bearing upward frictionally against the bottom of carriage 42. In the particular case here shown motor 62 drives a worm 68 meshing with a worm gear 70 driving a pulley 72 for a timing belt 74. This drives a mating pulley 76 which turns a drive wheel 78, which in turn drives pulley 66. A timing belt is used so that it can be left relatively loose to minimize transfer of vibration from the motor to the credit card and stylus.

In order to provide a desired quick start and stop of the carriage at high speed the pulley 66 is preferably movable, and is so mounted that it wedges between drive wheel 78 and carriage 50 for drive engagement, and is retracted when the drive is to be stopped. For this purpose the pulley 66 is mounted on the upper end of an arm 80 secured to a shaft 112 which also carries an arm 84 connected to the core 86 of a solenoid coil 88. The solenoid is here shown energized so that the core is raised, thus wedging pulley 66 into drive position. When the solenoid is deenergized the core drops and pulley 66 is moved out of drive position.

The shaft 112 also carries a movable stylus or pickup support 90. This is shown in down position, so that the pickup is free to rest on the carriage. However when the carriage drive is stopped, the support 90 rises and holds the pickup.

These parts are also shown in and may be described with reference to FIGS. 4, 5, 6 and 7 of the drawing. FIG. 7 shows the motor support plate 92 carried on vibration mounts 64, which in turn are carried by a fixed plate 94 secured to side walls 96 of the reader. The worm 68 is driven by the motor, and meshes with a worm gear 70 carried on a shaft 98 supported in anti-friction bearings 100. Shaft 98 carries the timing belt pulley 72. It will be understood that this is a toothed pulley meshing with a timing belt having uniform projections as shown in FIG. 2, thus establishing a fixed drive ratio, even if the belt is slack. The timing belt and pulleys may be of the type sold commercially by United States Rubber Company under the name "PowerGrip."

Figure 6:
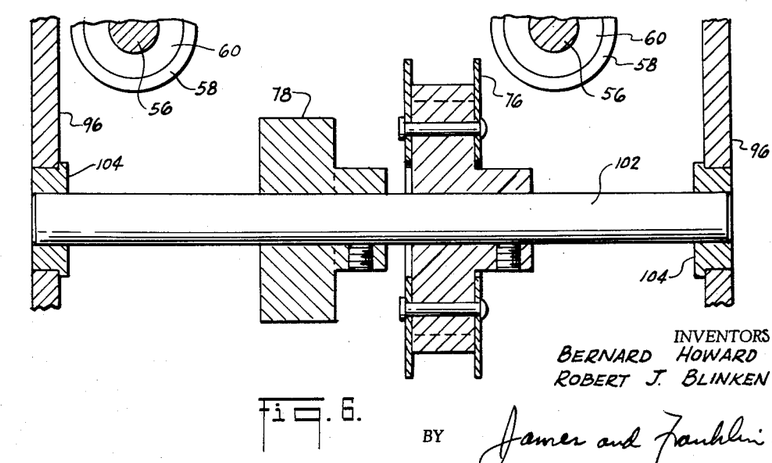
FIG. 6 is a fragmentary transverse section taken approximately in the plane of the line 6—6 of FIG. 2.

Referring now to FIG. 6, the driven pulley 76 is fixed on a shaft 102 carried in bearings 104 mounted in the side walls 96 of the reader. Shaft 102 carries the drive wheel 78 previously referred to. This is preferably a steel wheel with a smooth face.

Referring now to FIG. 5, the drive pulley 66 is preferably made of a frictional material, and may have a somewhat crowned surface as shown. The frictional material is carried on a metal hub 106, and the pulley assembly is freely rotatable in the upper end of arm 80 previously referred to. This is built up of sides which are spaced and rigidly held together by a series of spacers 108, there being three such spacers in this case. The sides are also spaced at their upper and lower ends as shown in the drawing, and the lower end is secured to a hub 110 locked on shaft 112, as by a setscrew 114. The shaft 112 is carried in bearings 116 secured in the side walls 96 of the reader.

Shaft 112 also carries the arm 84, the other end of which is connected to solenoid core 86 movable in solenoid coil 88. Arm 84 is secured to a hub 82 having a setscrew 83 as shown.

Shaft 112 further carries the pickup support 90 previously referred to, and in the present case this is secured directly to a hub 91 having a setscrew. In production manufacture these parts may be welded or may be made integral or may be secured together in any other convenient fashion.

Figure 4:
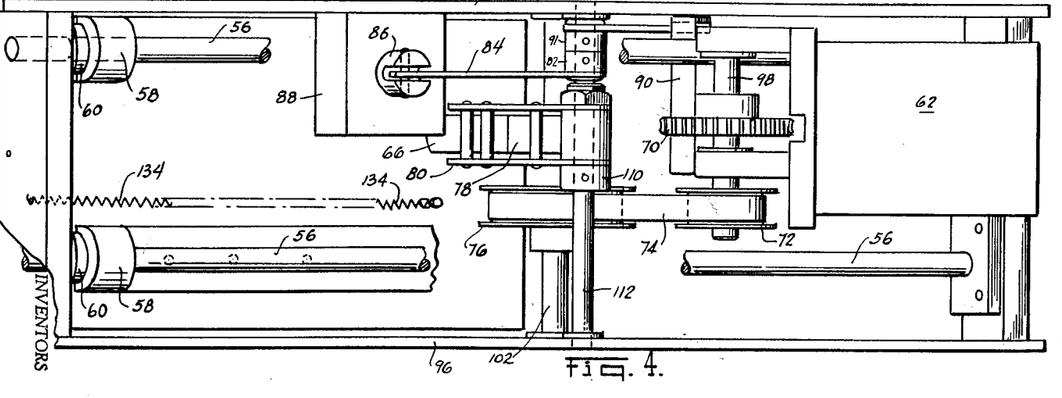
FIG. 4 is a bottom view with some parts removed to expose others.

In FIG. 4, which is a bottom view, the shaft and worm of motor 62 have been omitted, thereby better showing the worm gear 70 on shaft 98 with its timing belt pulley 72. The latter drives timing belt 74 and driven pulley 76 on its shaft 102. This carries the steel driving wheel 78. The latter is engaged by friction pulley 66 carried on pulley arm 80 secured to hub 110 on shaft 112, which also carries the solenoid arm 84 connected to the core 86 of the solenoid coil 88. The lower end of the pickup support arm 90 is also shown.

Figure 12:
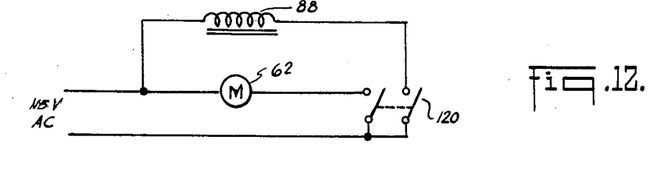
FIG. 12 is a wiring diagram for the drive of the reader.

The motor 62 and solenoid 88 preferably are operationally interrelated, and in the present case they are operated simultaneously so that the drive pulley is engaged when the motor operates, and vice versa. This is shown in FIG. 12 of the drawing, in which motor 62 and solenoid 88 are both operated from an ordinary 115 volt power supply. They are energized by the closing of a double pole switch 120 (or a single pole switch may be used). The slight time required for travel of the movable pulley provides a brief interval for acceleration and deceleration of the motor. At the same time the pickup head 44 is lowered into near engagement with the carriage (but not the credit card).

Actual engagement of the stylus with the tone groove is more precisely and accurately controlled, and for this purpose the pickup head 44 is provided with a cam follower 122 (FIGS. 2 and 2A) having a rounded lower end which rests on the carriage 42 near one edge of the same. At this time the stylus 124 is slightly raised from the record card held in seat 50. However the edge portion of the carriage is cut away to act as a cam which is depressed at 126 (FIG. 2A) with sloping cam ends at 128. The parts are so proportioned that the stylus is lowered during transmission for a distance slightly less than the length of the record groove, that is, when it is lowered it is lowered into the starting end of the groove, and it is raised on reaching the terminal end of the groove.

Figure 8:
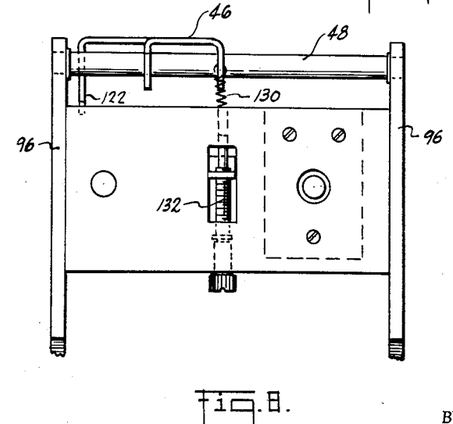
FIG. 8 is a rear view of the reader.

FIGS. 2 and 8 show a pull spring 130 which counterbalances a part of the weight of the pickup arm. The tension of the spring may be accurately adjusted by means of an adjusting screw 132. This adjustment leaves the desired amount of contact pressure at the stylus.

Figure 3:
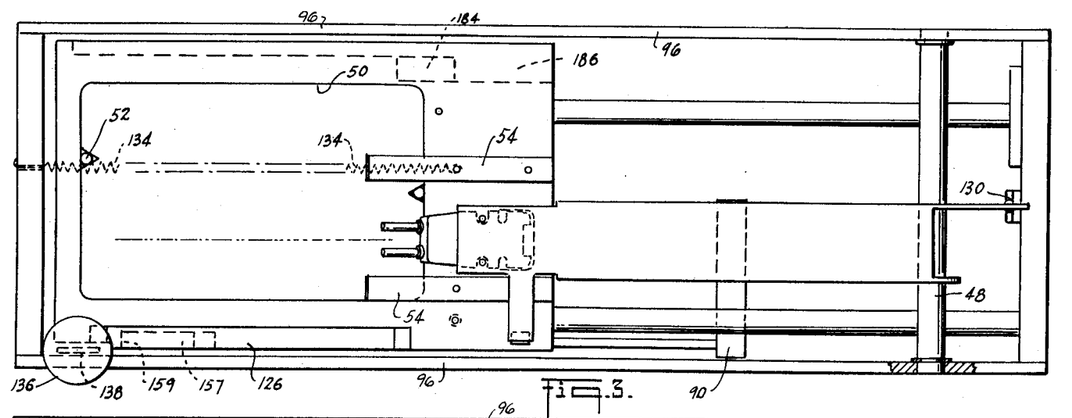
FIG. 3 is a plan view.

To interrogate the memory as to the validity of a credit card the card is inserted in seat 50 beneath springs 54, and a start button is pressed, whereupon the carriage moves up through its range of movement, following which the pickup is raised; the drive releases; and the carriage returns under pull of the return spring 134. This spring has been omitted in some figures but is shown in FIGS. 2 and 3. The start button is best shown at 136. It operates a linkage which accomplishes a number of things, and which makes the operation of the reader automatic through one complete cycle, once the button 136 has been depressed.

For this purpose button 136 (FIGS. 9 and 11) is mounted at the upper end 138 of a plate 140 which is normally pulled upward by a return spring 142. The plate is carried on and guided by a pair of stationary pins 144 received in a slot 146 in plate 140. The plate carries three pins shown at 148, 150 and 152. Pin 150 is a latch pin to hold the button down.

Pin 148 bears down on a step 153 of a stop plate 155 which is received (FIG. 9) in a bottom groove 157 in the carriage. The stop plate 155 bearing against the end 159 of groove 157 prevents upward or forward movement of the carriage 42. This is convenient and desirable in order to prevent motion of the carriage while forcibly inserting the credit card into its seat. When button 136 is depressed the stop 155 is moved down with the button by pin 158, and so frees the carriage for travel. This is shown by the change from FIG. 9 to FIG. 11.

Figure 9:
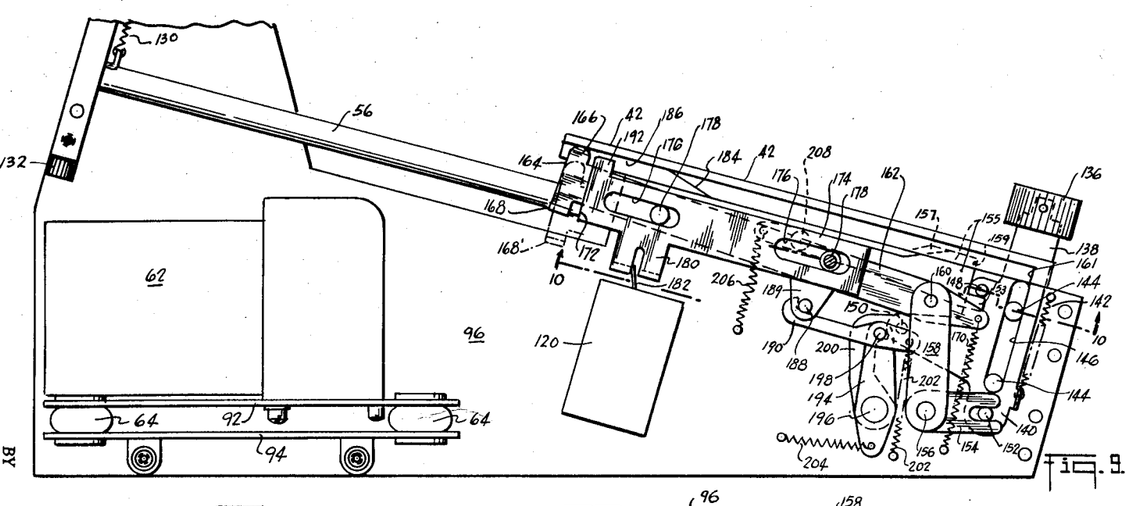
FIG. 9 is a partially sectioned side elevation, showing mechanism at the side opposite that shown in FIG. 2, and particularly the start button and associated linkage, with the button in raised position.
Figure 11:
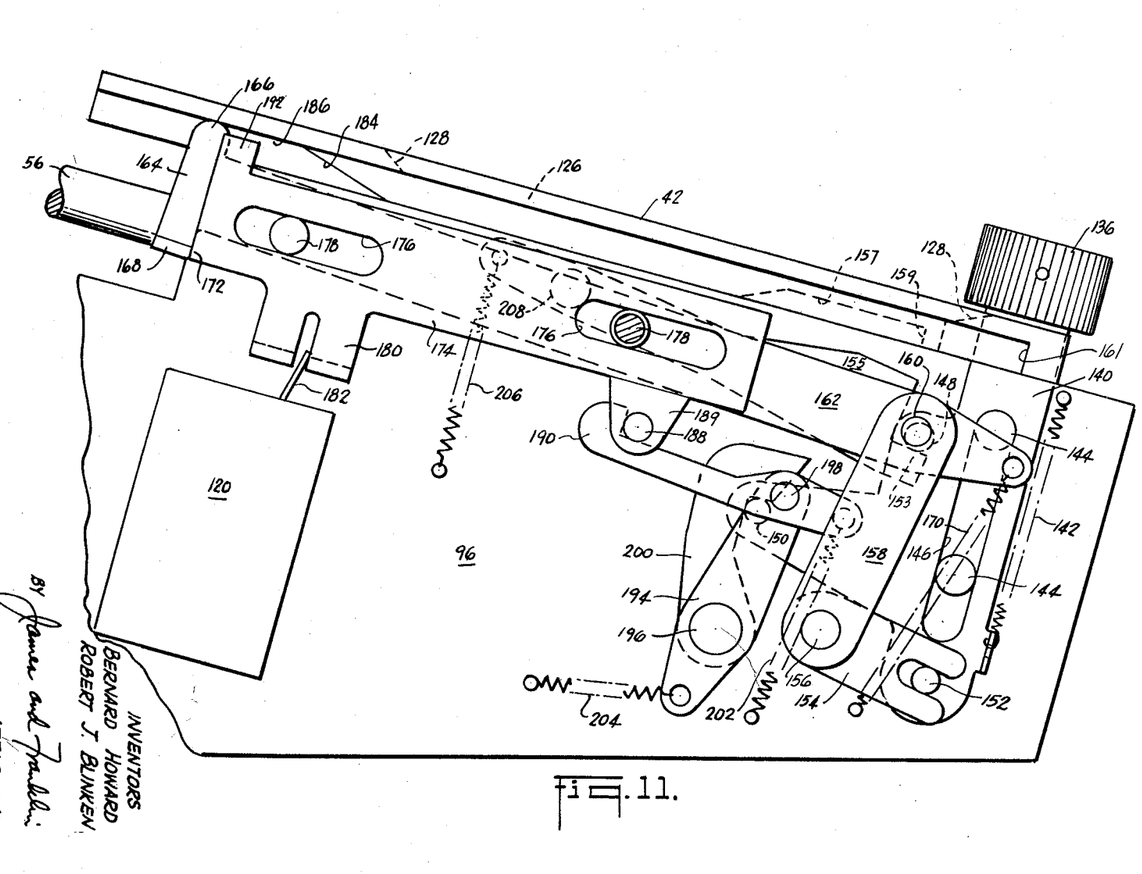
FIG. 11 is similar to a part of FIG. 9, drawn to larger scale, and shows the relation of the parts when the start button is depressed.

Another pin 152 is received in the bifurcated end of an arm 154 secured at 156 to an arm 158, so that the arms act as an angle lever. Arm 158 is connected at 160 to a pull link 162. This extends all the way forward to a head 164 having a cam follower 166 at the top, and a sidewardly bent lug 168 at the bottom. The head 164 is normally raised by the action of a pull spring 170 connected to the opposite or right end of pull link 162, the latter pivoting about the pin 160.

Figure 10:
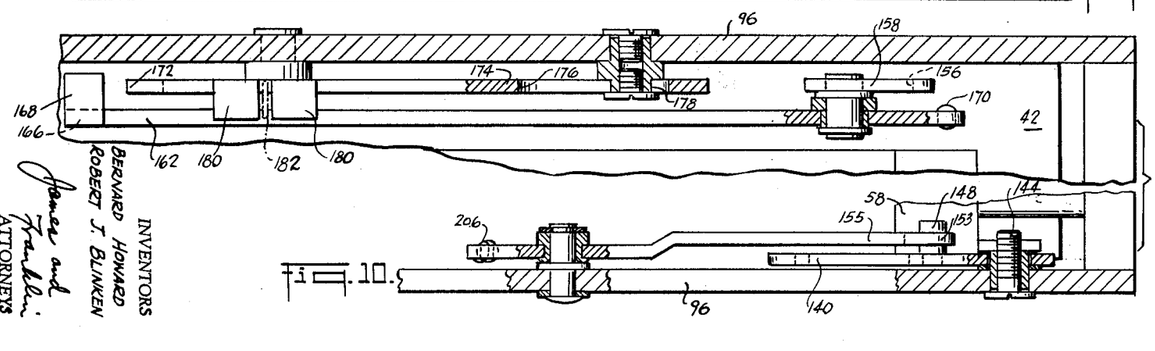
FIG. 10 is a partially sectioned bottom view taken approximately in the plane of line 10—10 of FIG. 9, and drawn to larger scale.

The sidewardly bent lug 168 (FIGS. 9, 10 and 11) comes in front of the end 172 of a switch actuator slide 174 having guide slots 176 slidable on stationary pins 178. The slide 174 has a yoke 180 receiving the operating end 182 of the motor-and-solenoid switch 120 previously referred to.

On reflection it will be evident that depression of the start button 136 draws the pull link 162 to the right, and the latter through its lug 168 pushes the switch actuator slide 174 to the right, as shown by the change from FIG. 9 to FIG. 11, and thus closes the normally open switch 120 to energize both the motor and the solenoid.

The carriage 42 then moves forward to transmit the desired telegraphic inquiry to the central office memory. As the carriage travels, and after say one-quarter of its travel distance, the cam follower 166 of the pull link 162 is cammed down from the solid line position to the broken line position 168' (FIG. 9) by means of a sloping cam surface 184 formed on the bottom of the carriage. Actually the left end 186 is a cam groove cut into the bottom of the carriage, and this groove has the sloping end 184. The downward movement brings the lug 168 to the broken line position 168' where it is below the corner 172 of the switch actuator slide 174, thus freeing the slide for return movement. However there is nothing to cause it to return at this time.

It carries a pin 188 secured to ear 189 of slide 174, and pin 188 engages a hook 190. Near the end of the carriage travel an abutment or groove end 161 reaches and hits the upwardly projecting tab 192 at the left end of the switch actuating slide 174. This moves the slide to the left, thereby opening the switch 120 and so releasing the solenoid with its drive pulley, and stopping the motor.

In the meantime the start button 136 has been latched in down position by a latch 200 holding latch pin 150. The latch is now released. For this purpose when slide 174 moves to the left the pin 188 moves hook 190 to the left, and this pulls an arm 194 to the left about a center 196, the hook 190 and arm 194 being linked at 198. The pin 196 also carries the latch or detent 200. This engages the third pin or latch pin 150 of the start button plate 140.

It is preferred to latch the start button in down position as a refinement, merely to guard against vibration which might affect the stylus pickup when the start button rises. With the present arrangement the start button does not rise unil the end of the code transmission.

A pull spring 142 raises the start button; a pull spring 202 serves to raise the hook 190; a pull spring 204 urges the detent 200 to the right; a pull spring 206 urges the stop 155 upward, the stop being pivoted at 208; and pull spring 170 raises the end 164 of the pull link 162 which is pivoted at 160.

With the friction pulley released the carriage returns because of its main pull spring 134 (FIGS. 2 and 3). The pickup is raised during the return travel of the carriage by the main pickup support 90 (FIG. 2), which rises as soon as the solenoid is deenergized. Otherwise cam follower 122 and cam groove 126 would permit the stylus to engage the record groove.

When the carriage has returned nearly to rest position the carriage stop 155 rises from the position shown in FIG. 11 to the position shown in FIG. 9, preparatory to again holding the carriage during removal of the used credit card, and during insertion of a next credit card.

Figure 16:
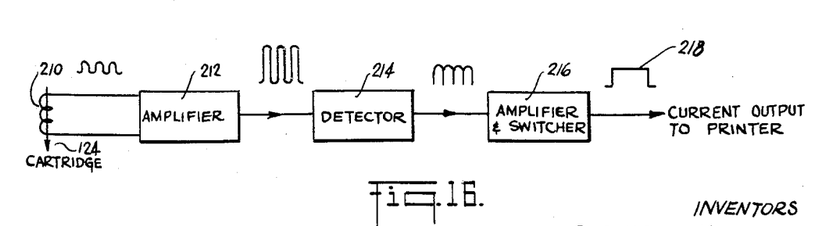
FIG. 16 is a block diagram of the transmitter forming a part of the reader.

The pickup circuitry of the reader may take varied forms, one of which is schematically illustrated in FIG. 16. Stylus 124 acts on cartridge 210, and its output is amplified at 212, and detected or rectified at 214 to produce a pulsating D.C., which may itself be amplified in a switching circuit 216 to produce rectangular pulses shown at 218. These act in accordance with a special or a conventional code, such as the five level or five element code commonly employed in telegraphy. However it may be mentioned that if the telegraph circuit is a carrier frequency circuit instead of a D.C. line, the 1,000 cycle pickup may be used to modulate the carrier frequency. In that case, instead of completely interrupting the tone frequency, the recording may use two different tones, with one frequency corresponding to "on," and the other corresponding to "off." In such case the circuitry indicated in FIG. 16 would differ in using a carrier oscillator and modulator circuit, instead of a detector circuit.

Figure 17:
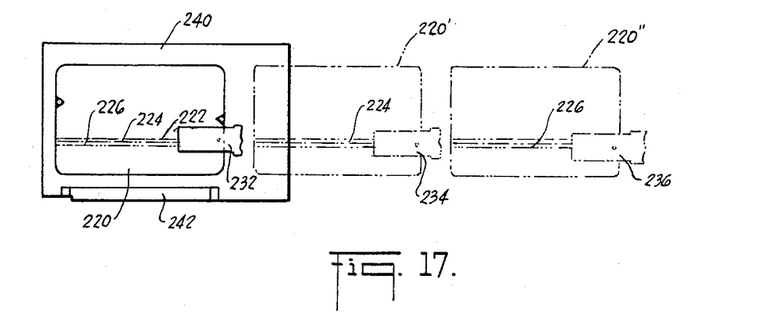
FIGS. 17 and 18 are explanatory of a modification using multiple recording grooves.
Figure 18:
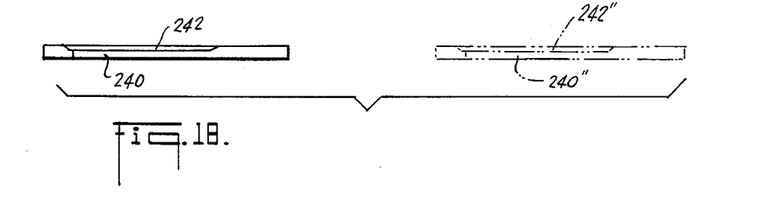

As so far described the credit card is assumed to have only a single record groove. It is possible to provide more than one groove to provide additional information, and such an arrangement is schematically illustrated in FIGS. 17 and 18 of the drawing. In this case the credit card 220 has three record grooves 222, 224 and 226. The card is mounted in a carriage which traverses about three times the length of the card, and it travels beneath three successive pickups, with pickup 232 located to reproduce groove 222, with pickup 234 located to reproduce groove 224; and with pickup 236 located to reproduce groove 226. The carriage 240 has a camming groove 242 which cooperates successively with the pickups, each pickup being lowered only during passage of its particular recording groove. The cam is wide enough for all three cam followers, or the followers are aligned even though the pickups are not. The three pickups may be connected in parallel in a common circuit, as at the left end of FIG. 16.

It is also possible to use three different tone frequencies for the three grooves; to use three styli side by side; to modulate the carrier simultaneously by all three tones; and to provide filters at the receiving end to discriminate between the three different tones, thereby transmitting and reproducing all three record grooves simultaneously at both the reader and the head office memory. Going further, a single groove engaging a single stylus may carry a more complex sound wave made up of the three different frequencies in appropriate code distribution. This composite sound wave modulates the carrier, and the three lines of information are separated by audio frequency filters at the receiver.

It will be understood that although we have referred to a credit card, the card more broadly could be an identification card to indicate whether an employee should be admitted to or be barred from a secret plant.

It is believed that the construction and operation of our improved credit card and reader, as well as the advantages thereof, will be apparent from the foregoing detailed description. The card may be preprinted with appropriate data which is common to all of the cards used by a particular organization. The individual cards may be embossed to act as a stencil for application to individual bills by pressure transfer at the time of purchase. The record groove here provided does not spoil either the printed matter or the embossed matter. For most purposes a single groove is adequate, but if needed, multiple grooves may be provided.

The reader is relatively small, simple and inexpensive. Its cost is kept easily within permissible range for use at the different dealers subscribing to the credit card system. The card may be inserted in its carriage forcibly without danger of the carriage moving. The button may be depressed for any random time, because it is latched down until the transmission is completed. Once the button has been depressed the reader goes through its complete cycle without further attention on the part of the operator until the carriage has been returned to its home or rest position, whereupon the credit card may be removed while awaiting appropriate signal from the head office memory.

It will be understood that while we have shown and described our credit card and reader in a preferred form, changes may be made in the structure shown, without departing from the scope of the invention, as sought to be defined in the following claims. In the claims the reference to a uniform tone frequency interrupted in accordance with a telegraphic code is not intended to exclude the use of two different tones one of which corresponds to "on" and the other of which corresponds to "off", as explained above.

We claim:

1. An identification card reader comprising a reciprocable carriage having a generally horizontal flat table to receive a support, an identification card of usual wallet size with a phonograph type record groove, said groove being a recording of a tone frequency interrupted in accordance with a telegraphic code for transmission of identification data, a phonograph type pickup with a stylus above said carriage, motor means to move the carriage relative to the pickup to cause the stylus to traverse the groove, and means connected to said pickup for transmission of the code signals on the card.

2. An identification card reader comprising a reciprocable carriage having means to receive an identification card with a phonograph type record groove, a phonograph type pickup with a stylus, means to move the carriage relative to the pickup to cause the stylus to traverse the groove, a support means to elevate the pickup above the card, and camming means between the carriage and the support means to lower the stylus during transmission for a distance of travel of the carriage somewhat less than the length of the record groove.

3. An identification card reader comprising a reciprocable carriage having means to receive an identification card with a phonograph type record groove, a phonograph type pickup with a stylus, motor means to move the carriage relative to the pickup to cause the stylus to traverse the groove, a switch to control the motor, a stop means to prevent movement of the carriage as an identification card is being inserted therein, and a start button to release the stop means and to operate the switch to start the motor.

4. An identification card reader comprising a reciprocable carriage having means to receive an identification card with a phonograph type record groove, a phonograph type pickup with a stylus, motor means to move the carriage relative to the pickup to cause the stylus to traverse the groove, a support means to elevate the pickup above the card, camming means between the carriage and the support means to lower the stylus during transmission for a distance of travel of the carriage somewhat less than the length of the record groove, a switch to control the motor, a stop means to prevent movement of the carriage as an identification card is being inserted therein, and a start button to release the stop means and to operate the switch to start the motor.

5. An identification card reader comprising a reciprocable carriage having means to receive an identification card with a phonograph type record groove recording an interrupted tone frequency, a phonograph type pickup with a stylus, means to move the carriage relative to the pickup to cause the stylus to traverse the groove, and electronic circuitry including an amplifier and a rectifier to derive a pulsed current for transmission over a telegraph line.

6. An identification card reader comprising a reciprocable carriage having means to receive an identification card with a phonograph type record groove recording an interrupted tone frequency, a phonograph type pickup with a stylus, means to move the carriage relative to the pickup to cause the stylus to traverse the groove, a support means to elevate the pickup above the card, camming means between the carriage and the support means to lower the stylus during transmission for a distance of travel of the carriage somewhat less than the length of the record groove, and electronic circuitry including an amplifier and a rectifier to derive a pulsed current for transmission over a telegraph line.

7. An identification card reader comprising a carriage having means to receive an identification card with a phonograph type record groove, a phonograph type pickup with a stylus, and means to move the carriage relative to the pickup to cause the stylus to traverse the groove, said means comprising a motor, a drive wheel driven thereby at a fixed location spaced beneath the carriage, and a frictional pulley movable to an idle position away from or to a driving position between the drive wheel and the carriage.

8. An identification card reader comprising a carriage having means to receive an identification card with a phonograph type record groove, a phonograph type pickup with a stylus, and means to move the carriage relative to the pickup to cause the stylus to traverse the groove, said means comprising a motor, a drive wheel driven thereby at a fixed location spaced beneath the carriage, a frictional pulley movable into driving position between the drive wheel and the carriage, a solenoid to move said pulley into driving position, a switch means to energize both the motor and the solenoid, and means automatically responsive to full travel of the carriage to de-energize the motor and solenoid.

9. An identification card reader as defined in claim 8, in which a stop means is provided to prevent undesired movement of the carriage when an identification card is being inserted therein, and in which a start button releases the said stop means in addition to operating the switch means for starting the motor and solenoid.

10. An identification card reader as defined in claim 8, in which a movable support is provided to elevate the pickup arm, said support being connected to the solenoid and friction pulley, the arrangement being such that the support raises the pickup when the pulley is inoperative, and the support is lowered when the pulley is moved into operative driving position.

11. An identification card reader as defined in claim 1, in which a movable support and a solenoid are provided to elevate the pickup arm, said support being so connected to the solenoid that the support raises the pickup when the solenoid is deenergized, and the support is lowered when the solenoid is energized, said solenoid being in a circuit which is energized when the motor is energized.

12. An identification card reader comprising a reciprocable carriage having means to receive an identification card with a phonograph type record groove, a phonograph type pickup with a stylus, motor means to move the carriage relative to the pickup to cause the stylus to traverse the groove, a switch to control the motor, a start button to operate the switch to start the motor, latch means to hold the start button in depressed position, and means responsive to travel of the carriage to release the start button at the end of the carriage travel.

13. An identification card reader comprising a reciprocable carriage having means to receive an identification card with a phonograph type record groove, a phonograph type pickup with a stylus, motor means to move the carriage relative to the pickup to cause the stylus to traverse the groove, a support means to elevate the pickup above the card, camming means between the carriage and the support means to lower the stylus during transmission for a distance of travel of the carriage somewhat less than the length of the record groove, a switch to control the motor, a start button to operate the switch to start the motor, latch means to hold the start button in depressed position, and means responsive to travel of the carriage to release the start button at the end of the carriage travel.

14. An identification card reader comprising a reciprocable carriage having means to receive an identification card with a phonograph type record groove, a phonograph type pickup with a stylus, motor means to move the carriage relative to the pickup to cause the stylus to traverse the groove, a switch to control the motor, a stop means to prevent movement of the carriage as an identification card is being inserted therein, a start button to release the stop means and to operate the switch to start the motor, latch means to hold the start button in depressed position, and means responsive to travel of the carriage to release the start button at the end of the carriage travel.

15. An identification card reader comprising a reciprocable carriage having means to receive an identification card with a phonograph type record groove, a phonograph type pickup with a stylus, motor means to move the carriage relative to the pickup to cause the stylus to traverse the groove, a support means to elevate the pickup above the card, camming means between the carriage and the support means to lower the stylus during transmission for a distance of travel of the carriage somewhat less than the length of the record groove, a switch to control the motor, a stop means to prevent movement of the carriage as an identification card is being inserted therein, a start button to release the stop means to hold the start button in depressed position, and means responsive to travel of the carriage to release the start button at the end of the carriage travel.

References Cited in the file of this patent

UNITED STATES PATENTS

| | | |
|---|---|---|
| 1,356,815 | Foresman | Oct. 26, 1920 |
| 1,541,002 | Shramek | June 9, 1925 |
| 2,010,867 | Kubo | Aug. 13, 1935 |
| 2,603,006 | MacChesney | July 15, 1952 |

FOREIGN PATENTS

| | | |
|---|---|---|
| 5,507 | Great Britain | Mar. 30, 1889 |